United States Patent [19]

Cardinal

[11] Patent Number: 4,588,577

[45] Date of Patent: May 13, 1986

[54] METHOD FOR GENERATING HYDROGEN

[76] Inventor: Earl V. Cardinal, 11105 Oak View Dr., Austin, Tex. 78759

[21] Appl. No.: 709,527

[22] Filed: Mar. 8, 1985

Related U.S. Application Data

[63] Continuation-in-part of Ser. No. 591,600, Mar. 20, 1984, abandoned.

[51] Int. Cl.[4] .............................................. C01B 13/00
[52] U.S. Cl. ..................................... 423/657; 423/658
[58] Field of Search ................................ 423/657, 658

[56] References Cited

U.S. PATENT DOCUMENTS

| | | | |
|---|---|---|---|
| 2,350,534 | 6/1944 | Rosinger | 423/DIG. 9 |
| 3,969,214 | 7/1976 | Harris | 204/275 |
| 4,202,744 | 5/1980 | Pan et al. | 423/648 R |
| 4,265,721 | 5/1981 | Hackmyer | 204/129 |
| 4,287,169 | 9/1981 | Anderson | 423/657 |
| 4,289,744 | 9/1981 | Anderson | 423/657 |
| 4,306,906 | 12/1981 | Anderson | 423/657 |
| 4,308,248 | 12/1981 | Anderson | 423/657 |
| 4,324,777 | 4/1982 | Anderson | 423/657 |
| 4,342,738 | 8/1982 | Burgund | 423/657 |
| 4,391,793 | 7/1983 | Boese | 423/648 R |
| 4,394,293 | 7/1983 | Gratzel et al. | 423/657 |
| 4,427,512 | 1/1984 | Han | 423/648 R |
| 4,437,963 | 3/1984 | Yeoman | 423/648 R |

FOREIGN PATENT DOCUMENTS

| | | | |
|---|---|---|---|
| WO81/00279 | 2/1981 | PCT Int'l Appl. | 423/657 |
| 611661 | 6/1978 | U.S.S.R. | 423/DIG. 9 |

*Primary Examiner*—John Doll
*Assistant Examiner*—Wayne A. Langel
*Attorney, Agent, or Firm*—Fulwider, Patton, Rieber, Lee & Utecht

[57] ABSTRACT

This invention is directed to the generation of hydrogen gas from hot water by means of a metallic catalyst such as nickel powder and a chelating agent such as EDTA. Temperature of the water should range from about 60° C. to 150° C. but preferably not above the boiling point of the water. The water is preferably heated by waste heat, and the hydrogen is utilized as a supplemental fuel for fossil fuels such as gas, oil and coal. Increased hydrogen generation can be obtained by subjecting the water mixture to a magnetic field or to ultrasonic radiation.

13 Claims, No Drawings

METHOD FOR GENERATING HYDROGEN

This application is a continuation-in-part application of U.S. Application Ser. No. 591,600, filed Mar. 20, 1984, abandoned

BACKGROUND OF THE INVENTION

This invention relates to a process for the generation of hydrogen, and particularly to the generation of hydrogen gas from water heated by waste heat for use as a fuel to supplement fossil fuels.

The use of hydrogen gas to supplement fossil fuel and the advantages thereof are well known. See, for example, NASA Technical Note D-8487 by John F. Cassidy entitled "EMISSIONS AND TOTAL ENERGY CONSUMPTION OF A MULTI-CYLINDER PISTON ENGINE RUNNING ON GASOLINE IN A HYDROGEN GASOLINE MIXTURE," and NASA Technical Paper 1247 by Theodore A. Brabbs entitled "CATALYTIC DECOMPOSITION OF METHANOL FOR ON-BOARD HYDROGEN GENERATION." While the above references are primarily directed to automotive uses for hydrogen gas, it is readily apparent that there is a wide spectrum of uses for hydrogen gas as a supplemental fuel. For example, hydrogen can be used in electrical generation plants wherein fossil fuels are utilized to generate steam.

Unfortunately, however, in most instances the cost for generating hydrogen gas far exceeds the value of the hydrogen as a fuel. Invariably special circumstances are necessary in order to be able to justify the use of hydrogen as a fuel.

Much effort has been put into developing processes which generate low cost hydrogen from water. Such processes include electrolytic, photolytic or high temperature processes to dissociate water to form the hydrogen. Reference is made to the patents listed below which describe some of these processes. The list provided is not exhaustive.

| U.S. Pat. No. | Inventor | Issue Date |
| --- | --- | --- |
| 3,969,214 | Harris | July 13, 1976 |
| 4,202,744 | Pan | May 13, 1980 |
| 4,265,721 | Hackmyer | May 5, 1981 |
| 4,391,793 | Boese | July 5, 1983 |
| 4,394,293 | Gratzel et al. | July 19, 1983 |
| 4,427,512 | Han | January 24, 1984 |
| 4,437,963 | Yeoman | March 20, 1984 |

However, to date there remains a need for a low cost method of generating hydrogen gas, particularly for generating hydrogen to supplement fossil fuels such as oil, gas and coal. The present invention satisfies this need.

SUMMARY OF THE INVENTION

The present invention is generally directed to a low cost process for generating hydrogen gas from water and particularly the use of waste heat to develop and maintain the water temperature required for the hydrogen generation.

In accordance with the present invention water at a temperature from about 60° C. to about 150° C., and containing small amounts of a chelating agent, is treated with a finely divided metallic catalyst such as one or more metals selected from the group consisting of nickel, cobalt, iron, platinum, palladium, magnesium, manganese, copper and alloys thereof. Generally, the particle size of the catalyst should be small enough to pass through a 20 mesh screen, and preferably through a 50 mesh screen (U.S. series).

Substantially improved hydrogen generation can be obtained if the chelating agent is ethylenediaminetetraacetic acid (EDTA). The salts (e.g., sodium) of EDTA tend to be less efficient than EDTA itself. Small amounts (e.g., up to 0.5 gm per ml of water) of detergents can increase gas generation and to a considerable extend mitigate the effect of the salts of EDTA. Further improvement in hydrogen generation can be obtained by subjecting the water-catalyst mixture to an electromagnetic field or ultrasonic radiation and also by agitating the water-catalyst mixture.

Due to the modest water temperature requirements, waste heat, which is readily found in most energy generation systems, can be utilized to develop and maintain the water at the desired temperature. Other heat sources are also contemplated The process of the invention is simple and inexpensive to operate, and it can be utilized both on large scale and small scale. Moreover, the process does not need sophisticated control equipment nor does it need an excessive amount of energy to develop the hydrogen gas. These and other advantages will become more apparent from the following detailed description of the invention.

DETAILED DESCRIPTION OF THE INVENTION

This invention is directed to a process of generating hydrogen from hot water containing a chelating agent by contacting such water with one or more finely divided metallic catalysts. Preferably, the water is subject to electromagnetic or ultrasonic radiation to accelerate the hydrogen generation.

The temperature of the water utilized in the present invention is maintained at about 60° C. to about 150° C. However, to avoid generation of considerable quantities of water vapor, which ultimately must be separated from the hydrogen gas, it is preferred to maintain the temperature of the solution below the boiling point thereof.

The metallic catalysts suitable in the present process includes metals such as nickel, cobalt, platinum, palladium, chromium, iron, magnesium, manganese, copper, alloys thereof, and mixtures of the above metallic catalysts. Generally, the amount of catalyst added to the water ranges from about 0.001 gm to about 5 gms, preferably about 0.01 to about 2 gm, of metallic catalyst per milliliter of water. A wide variation in the amount of catalyst is allowed, but the requirement therefor depends upon the effectiveness of the catalyst used, the surface area of the catalyst and the time of contact thereof with the hot water. Catalysts in amounts more than 5 gms per ml of water are not necessarily detrimental but merely unnecessary. Generally, it has been found that sufficient catalyst surface is provided by a finely divided material which will pass through a 20 mesh, preferably a 50 mesh (U.S. Series) screen.

Nickel and nickel alloys are the preferred catalyst, both from the standpoint of efficiency in producing hydrogen and the cost thereof. The noble metals, such as platinum and palladium, while effective, are most expensive and are not very desirable from that standpoint. The other metals, such as cobalt, iron, magnesium, manganese, chromium and copper, while suitable, are much less efficient than nickel. Frequently, it may be desirable to deposit the metallic catalyst on a carrier such as carbon or aluminum oxide, particularly when using the noble metal catalysts. Additionally, agitation of the water-catalyst mixture by mixing or stirring can improve hydrogen generation.

The chelating agent, such as EDTA, is preferably maintained at a concentration equivalent to about one to twenty grams of EDTA per liter of treated water. The use of the chelating agent can increase the hydrogen generation by a factor of two or more over the amount of hydrogen generated by means of the catalyst alone. The EDTA is particularly useful because it maintains the pH of the solution at a level well below 5 (usually, less than about 4) which greatly facilitates production of hydrogen gas. With a pH above about 4, particularly above 5, the generation of hydrogen is usually too sluggish to be of any significant interest.

Further substantial increases in hydrogen gas generation can be obtained by subjecting the water-catalyst interface to an electromagnetic field or to ultransonic radiation. The magnetic field can be generated by passing electrical current through coils surrounding the reactor containing the hot water and catalyst or by including magnetized material in the water such as ferrites, lodestone or magnetized metal.

In a preferred embodiment, the hot water, metallic catalyst and chelating agent are directed to a reaction zone where intimate contact between the components is maintained. A high degree of mixing is preferably in the reaction zone to minimize the passivation of the catalyst surface. The chelating agent, particularly the EDTA, aids in this function by ensuring that oxides and other degradation products do not contaminate the catalyst surface or otherwise interfere with the functions thereof.

Continuous or batch processing can be employed with the present process. Spiral screws or other types of mixing blades are suitable to keep the catalyst mixed with the hot water in the reaction zone. All of the standard safety precautions for handling hydrogen gas should be employed with the hydrogen gas generated by the present process.

The process described herein is primarily directed to the use of the hydrogen as a fossil fuel supplement which does not require stringent compositional controls. Other uses for the hydrogen gas generated by the process, for example, as feed stock for chemical processing to manufacture other chemicals, may require purification of the gas prior to such use.

The following examples are given to further illustrate embodiments of the invention.

EXAMPLE 1

Three grams of EDTA and 15 grams of a carbonaceous catalyst support base containing 5% (by weight) finely divided palladium were mixed with 90 ml of water. The mixture was placed in a reactor consisting of a one inch diameter by 12 inch copper tube. The upper end is provided with a stopcock to direct the gases generated to a gas burette for collection and measurement. The temperature of the mixture was controlled to about 80° C. The hydrogen gas which evolved was collected over a measured time interval in the gas burette. Approximately 900 cc of gas per hour was obtained.

EXAMPLE 2

Three grams of EDTA, 15 grams of an aluminum oxide catalyst support base containing 1% (by weight) of finely divided platinum and 10 grams of nickel powder (−100 mesh) were mixed with 90 ml of water. The mixture was charged into the reactor tube described in Example 1 and the temperature of the mixture was controlled to about 80° C. A magnetic coil surrounding the reactor was energized to develop a magnetic field within the reaction mixture, and a 2 mm steel rod was placed in the reaction mixture in order to increase the magnetic field strength. The gas, which was collected as before, was generated at a rate of approximately 1100 cc per hour.

EXAMPLE 3 to further illustrate the beneficial effects of the EDTA, the magnetic field and nickel as a catalyst, a series of tests were conducted utilizing the apparatus and experimental techniques described above in Examples 1 and 2. In the first case, approximately 90 ml of water and 15 grams of a catalyst comprising 5% (by weight) of finely divided palladium on a carbon catalytic support base were charged to the reactor tube and the temperature of the mixture was maintained at about 80° C. Gas, which was collected as before, was generated at a rate of approximately 78 cc per hour.

EXAMPLE 4

In a second case, approximately 90 ml of water containing 3 gms of EDTA and 15 gms of a catalyst comprising 5% (by weight) of finely divided palladium on a support base as described above in Example 2 were charged to the reactor tube and the temperature of the mixture was maintained at about 80° C. Gas, which was collected as before, was generated at a rate of approximately 411 cc per hour.

EXAMPLE 5

The mixture described above in Example 4 was charged to the reactor tube and maintained at 80° C. as before and was subjected to a magnetic field. Gas, which was collected as before, was generated at a rate of approximately 670 cc per hour.

EXAMPLE 6

Approximately 100 mg of nickel powder (100 mesh) was added to the mixture described above in Example 4, and the mixture was charged to the reactor tube and maintained at 80° C. as before. Gas, which was collected as before, was generated at a rate of approximately 943 cc per hour.

EXAMPLE 7

The mixture described in Example 6 above was charged to the reactor tube and maintained at 80° C. as before and subjected to a magnetic field. Gas, which was collected as before, was generated at a rate of approximately 1965 cc per hour.

EXAMPLE 8

Twenty-eight grams of wet, finely divided Raney nickle (14 grams on a dry basis), which had been previously magnetized, were mixed with 125 ml of water containing 3 grams of EDTA. The mixture was charged to the reactor and maintained at a temperature of 80° C. Approximately 840 cc per hour of gas was generated.

EXAMPLE 9

Ten grams of −100 mesh, previously magnetized nickel powder manufactured by the Aldrich Chemical Co. was mixed with 3 grams of EDTA, charged to the reactor as previously described and was maintained at a temperature of about 80° C. Approximately 2378 cc/hr of gas were generated.

In the above examples, the gas generated was predominantly hydrogen; however, analysis of the gas indicates that a small portion (e.g., up to 5%) of the gas generated was oxygen. As is clearly evident from the above examples, substantially increased amounts of hydrogen gas are generated by utilizing nickel as a catalyst, by utilizing a chelating agent and by subjecting the mixture to magnetic radiation.

Due to the relatively low temperature of the water, the amount of water vapor entrained in the hydrogen gas stream is very small, so that the generated hydrogen gas can be used directly as a fuel. For example, the gaseous products can be directed to an internal combustion engine in a landvehicle or a marine vessel or to a burner in an electrical generating facility utilizing heat to convert water to steam. Moreover, due to the low temperature of the water, a wide variety of waste heat sources can be used to develop and maintain the temperature of the water.

It is obvious that various modifications and improvements can be made to the invention without departing from the scope thereof.

I claim:

1. A thermally activated method of generating hydrogen gas consisting of contacting a finely divided metallic catalyst selected from the group consisting of nickel, cobalt, iron, palladium, platinum, copper, magnesium, manganese, alloys of said metals and mixtures thereof with water which is maintained at a temperature from 60° C. to 150° C. and which contains a chelating agent.

2. The method of claim 1, wherein the metallic catalyst is predominantly nickel or alloys thereof.

3. The method of claim 1 wherein the chelating agent is ethylenediaminetetraacetic acid.

4. The method of claim 1 wherein the temperature of the water is maintained below the boiling point thereof.

5. The method of claim 1 wherein the pH of the water is less than 5.

6. The method of claim 1 wherein the water-catalyst interface is subjected to a magnetic field.

7. The method of claim 1 wherein waste heat is used to maintain the temperature of the water.

8. The method of claim 1 wherein the metallic catalyst particles are small enough to pass through a 20 mesh screen.

9. The method of claim 8 wherein the metallic catalyst particles are small enough to pass through a 50 mesh screen.

10. The method of claim 1 including the additional step of mixing the hydrogen gas with a fossil fuel and combusting the mixture.

11. The method of claim 1 wherein the water and metallic catalyst are intermixed while hydrogen is being generated to increase the generation rate thereof.

12. The method of claim 1 wherein a detergent is added in amounts up to about 0.5 gm per ml of water.

13. The method of claim 1 wherein carbonaceous material is incorporated into the water.

* * * * *